United States Patent
Winsor et al.

(10) Patent No.: US 7,886,530 B2
(45) Date of Patent: Feb. 15, 2011

(54) INTERNAL COMBUSTION ENGINE WITH DUAL PARTICULATE TRAPS AHEAD OF TURBOCHARGER

(75) Inventors: Richard Edward Winsor, Waterloo, IA (US); Kirby Jon Baumgard, Cedar Falls, IA (US)

(73) Assignee: Deere & Company, Moline, IL (US)

( * ) Notice: Subject to any disclaimer, the term of this patent is extended or adjusted under 35 U.S.C. 154(b) by 168 days.

(21) Appl. No.: 12/395,037

(22) Filed: Feb. 27, 2009

(65) Prior Publication Data
US 2009/0151328 A1 Jun. 18, 2009

Related U.S. Application Data

(63) Continuation of application No. 11/298,882, filed on Dec. 9, 2005, now abandoned.

(51) Int. Cl.
*F01N 3/00* (2006.01)
(52) U.S. Cl. ............... 60/295; 60/274; 60/280; 60/292; 60/311; 60/324; 60/602; 60/605.1; 60/612
(58) Field of Classification Search ............ 60/274, 60/280, 285, 286, 292, 295, 297, 311, 324, 60/600, 602, 605.1, 612
See application file for complete search history.

(56) References Cited

U.S. PATENT DOCUMENTS

| | | | | |
|---|---|---|---|---|
| 5,517,976 A | * | 5/1996 | Bachle et al. | 123/568.11 |
| 5,930,995 A | | 8/1999 | Watanabe et al. | |
| 6,276,138 B1 | * | 8/2001 | Welch | 60/602 |
| 6,360,732 B1 | | 3/2002 | Bailey et al. | |
| 6,729,128 B2 | | 5/2004 | Shiratani et al. | |
| 6,918,251 B2 | | 7/2005 | Yanagisawa et al. | |
| 6,968,689 B2 | * | 11/2005 | Bleile et al. | 60/612 |
| 7,080,635 B2 | | 7/2006 | Sato | |
| 1,107,761 A1 | | 9/2006 | Chau et al. | |
| 7,107,761 B2 | * | 9/2006 | Fukuma et al. | 60/285 |
| 7,305,828 B2 | | 12/2007 | Todoroki et al. | |
| 7,490,462 B2 | * | 2/2009 | Roozenboom et al. | 60/278 |
| 7,757,489 B2 | * | 7/2010 | Endres et al. | 60/602 |
| 2002/0189247 A1 | | 12/2002 | Kato et al. | |
| 2004/0040287 A1 | | 3/2004 | Bautel et al. | |
| 2004/0083719 A1 | | 5/2004 | Xu et al. | |

FOREIGN PATENT DOCUMENTS

| | | |
|---|---|---|
| EP | 0823545 B1 | 3/2002 |
| EP | 1715150 A1 | 10/2006 |
| JP | 4109018 | 4/1992 |
| JP | 650127 | 2/1994 |
| WO | 2005078247 A1 | 8/2005 |

* cited by examiner

*Primary Examiner*—Binh Q. Tran
(74) *Attorney, Agent, or Firm*—Taylor IP

(57) ABSTRACT

An internal combustion engine includes a turbocharger having a turbine, a first set of combustion cylinders, and a second set of combustion cylinders. A first particulate trap is in fluid communication between the first set of combustion cylinders and the turbine. A second particulate trap is in fluid communication between the second set of combustion cylinders and the turbine.

8 Claims, 3 Drawing Sheets

US 7,886,530 B2

INTERNAL COMBUSTION ENGINE WITH DUAL PARTICULATE TRAPS AHEAD OF TURBOCHARGER

CROSS REFERENCE TO RELATED APPLICATIONS

This is a continuation of U.S. patent application Ser. No. 11/298,882 entitled INTERNAL COMBUSTION ENGINE WITH DUAL PARTICULATE TRAPS AHEAD OF TURBOCHARGER filed on Dec. 9, 2005 now abandoned.

FIELD OF THE INVENTION

The present invention relates to internal combustion engines, and, more particularly, to a method and apparatus for filtering particulates from an exhaust stream in such an internal combustion engine.

BACKGROUND OF THE INVENTION

In order to meet future particulate emission standards for internal combustion (IC) engines, in particular diesel engines, manufacturers of diesel engines are using particulate filters (also referred to as particulate traps). Such particulate traps are typically placed downstream of the turbocharger turbine and remove solid particulate matter before it exits the exhaust system to the ambient environment. After a particulate trap collects particulates for a period of time, increasing the exhaust temperature to a suitable level cleans the trap (also known as regenerating) since the oxygen in the exhaust burns the accumulated carbon in the trap.

Particulate traps for diesel engines are typically relatively large and expensive, and regeneration under light load conditions is problematic because attaining the necessary exhaust temperature is difficult. The use of particulate traps for diesel engines operating under varying load conditions therefore is quite limited.

What is needed in the art is a diesel engine which uses a particulate trap to remove solid particulate matter from the exhaust emissions, with the trap being able to be regenerated under any load conditions on the engine.

SUMMARY OF THE INVENTION

The invention comprises, in one form thereof, an internal combustion engine including a turbocharger having a turbine, a first set of combustion cylinders, and a second set of combustion cylinders. A first particulate trap is in fluid communication between the first set of combustion cylinders and the turbine. A second particulate trap is in fluid communication between the second set of combustion cylinders and the turbine.

The invention comprises, in another form thereof, a method of operating an internal combustion engine with a plurality of combustion cylinders, including the steps of: filtering particulates from a first set of the combustion cylinders using a first particulate trap in communication between the first set of combustion cylinders and a turbocharger; and filtering particulates from a second set of the combustion cylinders using a second particulate trap in communication between the second set of combustion cylinders and the turbocharger.

DETAILED DESCRIPTION OF THE INVENTION

Figure 1:
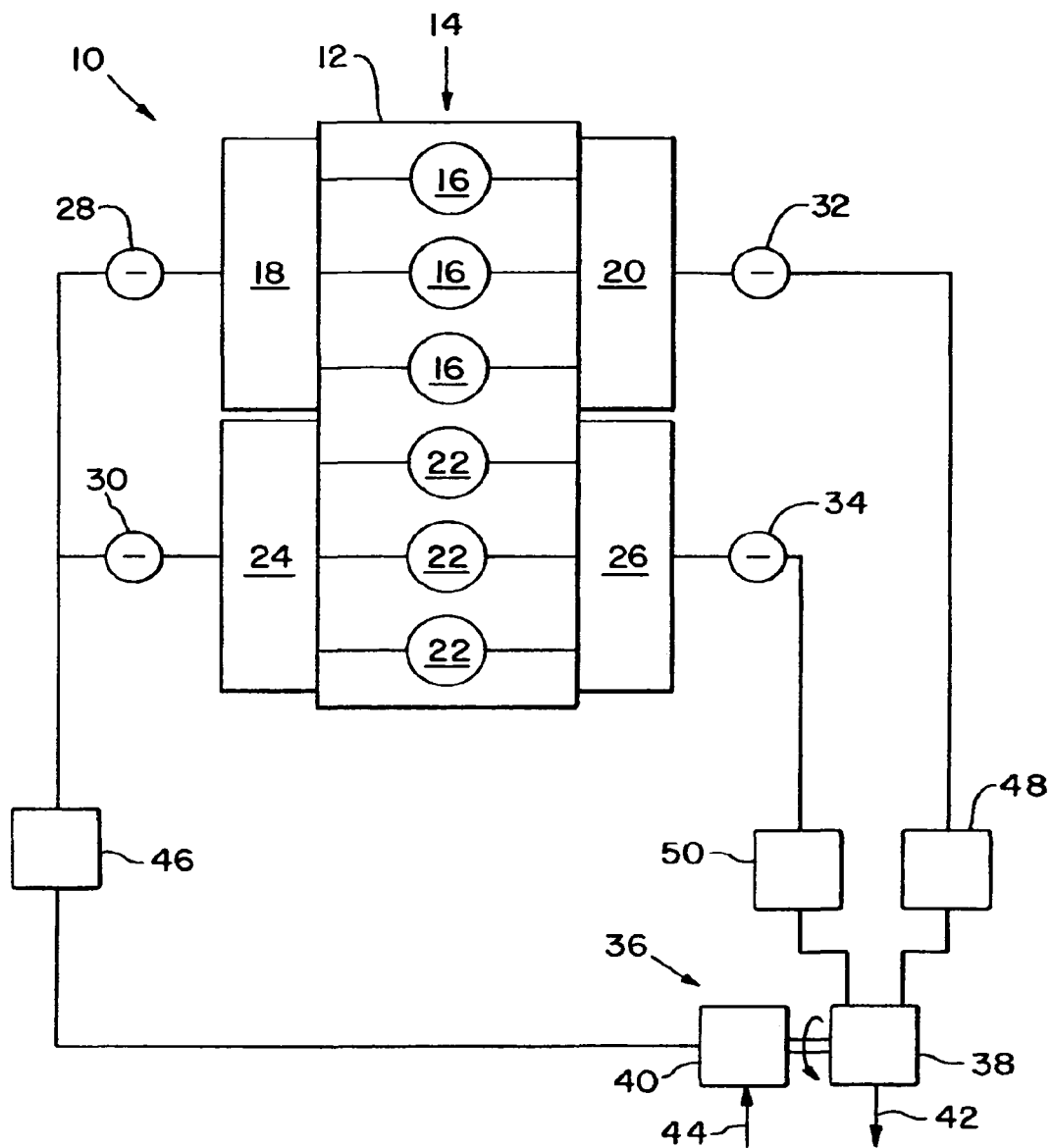
FIG. 1 is a schematic view of an embodiment of an internal combustion engine of the present invention.

Referring now to the drawings, there is shown an embodiment of an IC engine 10 of the present invention, which generally includes a block 12 defining a plurality of combustion cylinders 14. In the embodiment shown, IC engine 10 is a diesel engine including six combustion cylinders 14, but may include a different number of combustion cylinders, such as eight, ten, twelve, etc. The plurality of combustion cylinders 14 includes a first set of combustion cylinders 16 which are in communication with an intake manifold 18 and an exhaust manifold 20; and a second set of combustion cylinders 22 in communication with an intake manifold 24 and an exhaust manifold 26.

Located on the upstream side of each intake manifold 18 and 24 is an optional intake throttle 28 and 30, respectively, which may be independently and selectively actuated to control the air flow into first set of combustion cylinders 16 or second set of combustion cylinders 22.

Similarly, optional exhaust brakes 32 and 34 are located on a downstream sides of exhaust manifolds 20 and 26, respectively, and may be independently and selectively actuated to control a flow of exhaust gases therefrom. Intake throttles 28, 30 and exhaust brakes 32, 34 are shown as being selectively actuatable restrictions in the corresponding fluid lines in FIG. 1, but may have a number of different configurations to control fluid flow (i.e., and in turn load) associated with first set of combustion cylinders 16 or second set of combustion cylinders 22.

Exhaust manifolds 20 and 26 each have an exhaust outlet which is in fluid communication with a turbocharger 36 including a turbine 38 which rotatably drives a compressor 40. The spent exhaust gas exits turbine 38 and is exhausted to the ambient environment, as indicated by arrow 42.

Compressor 40 receives combustion air from the ambient environment, as indicated by line 44, and provides compressed combustion air to intake manifolds 18 and 24. The compressed combustion air is heated as a result of the work during the compression operation, and is cooled by an aftercooler 46 located downstream from compressor 40.

According to an aspect of the present invention, a first particulate trap 48 is in fluid communication between first set of combustion cylinders 16 and turbine 38, and a second particulate trap 50 is in fluid communication between second set of combustion cylinders 22 and turbine 38. Each particulate trap 48 and 50 filters particulates from the exhaust streams which are exhausted from exhaust manifolds 20 and 26, respectively.

During operation of IC engine 10, first particulate trap 48 filters particulates from first set of combustion cylinders 16, and second particulate trap 50 filters particulates from second set of combustion cylinders 22. In the event it is necessary to regenerate (i.e., clean) first particulate trap 48 and/or second particulate trap 50, it is desirable to control the fuel flow rate as well as the combustion air flow rate to first set of combustion cylinders 16 or second set of combustion cylinders 22 in a manner that increases the temperature and oxygen within first particulate trap 48 or second particulate trap 50.

More particularly, to regenerate first particulate trap 48, it is possible to increase the fuel rate to first set of combustion cylinders 16 and decrease the fuel rate to second set of combustion cylinders 22. This provides a temperature and oxygen concentration within first particulate trap 48 which is sufficient to burn the accumulated carbon within first particulate trap 48. It is also possible to apply exhaust brake 34 or intake throttle 30 to the non-regenerating second set of combustion cylinders 22, which causes the load to increase on the regenerating first set of combustion cylinders 16, thereby increasing the exhaust temperature within first particulate trap 48. In this manner, regeneration of first particulate trap 48 can occur under virtually any load condition.

Conversely, to regenerate second particulate trap 50, it is possible to increase a fuel rate to second set of combustion cylinders 22 and decrease a fuel rate to first set of combustion cylinders 16, thereby regenerating second particulate trap 50. Intake throttle 28 and exhaust brake 32 can similarly be applied to the non-regenerating first set of combustion cylinders 16, which causes the load to increase on the regenerating second set of combustion cylinders 22, thereby increasing the exhaust temperature within second particulate trap 50 for burning the accumulated carbon therein.

Figure 2:
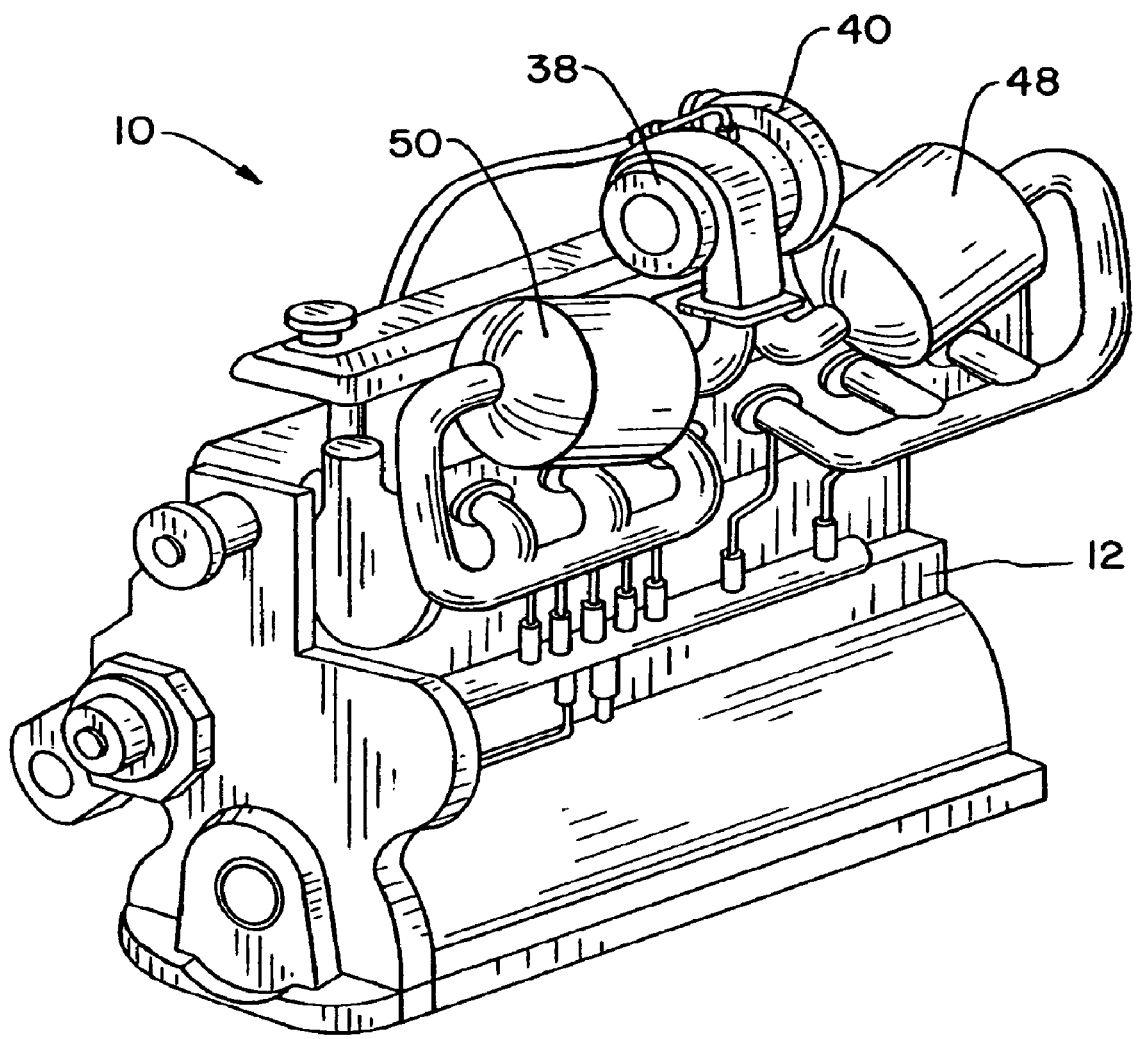
FIG. 2 is a perspective view of the internal combustion engine shown in FIG. 1.
Figure 3:
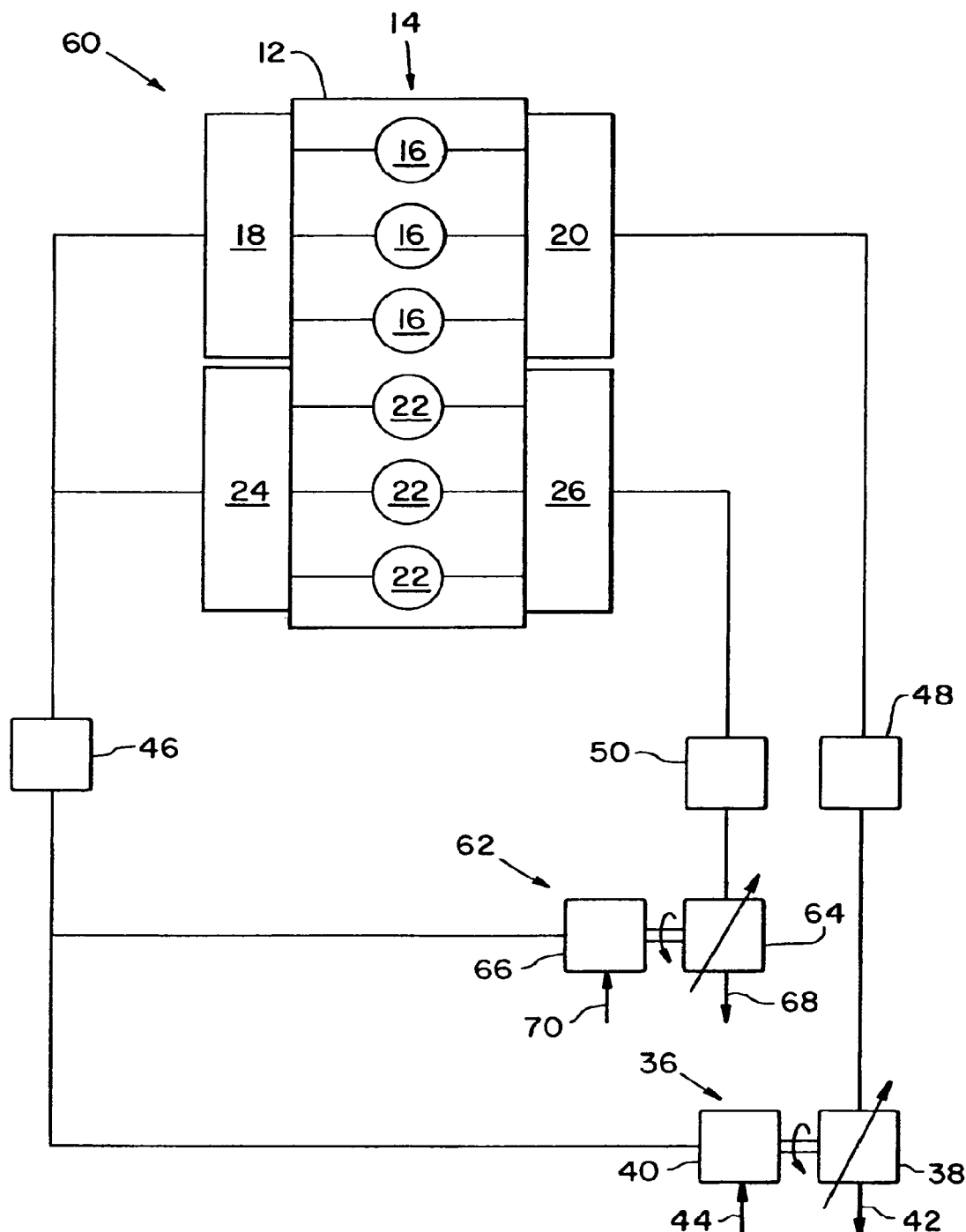
FIG. 3 is a schematic view of another embodiment of an internal combustion engine of the present invention.

Referring now to FIG. 3, there is shown another embodiment of an IC engine 60 of the present invention. IC engine 60 is similar in many respects to IC engine 10 shown in FIGS. 1 and 2, as indicated by the majority of the corresponding reference numbers. In contrast with the embodiment of IC engine 10 shown in FIG. 1, however, each particulate trap 48 and 50 is coupled in parallel with a corresponding turbocharger 36 and 62, respectively. Turbocharger 62 includes a turbine 64 which rotatably drives a compressor 66. The spent exhaust gas from exhaust manifold 26 exits turbine 64 and is exhausted to the ambient environment, as indicated by arrow 68. Compressor 66 receives combustion air from the ambient environment, as indicated by line 70.

In the embodiment of IC engine 10 shown in FIG. 1, optional and controllable flow restrictions 28, 30, 32 and 34 are used to exert an additional load on the set of combustion cylinders associated with the non-regenerating particulate trap 48 or 50, to assist in the regeneration of the regenerating particulate trap 48 or 50. IC engine 60 shown in FIG. 3 does not include controllable flow restrictions, but instead includes two variable geometry turbochargers 36 and 62 which may be controllably actuated in a manner to exert an additional load on the set of combustion cylinders associated with the non-regenerating particulate trap 48 or 50. In the embodiment shown in FIG. 1, turbocharger 36 is configured as a fixed geometry turbocharger, and in the embodiment shown in FIG. 3, turbochargers 36 and 62 are each configured as a variable geometry turbocharger (VGT), as indicated by the diagonal arrows through turbines 38 and 64, respectively. Depending upon which particulate trap 48 or 50 is being regenerated, the vanes in the turbine of the other turbocharger may be actuated to provide a flow restriction and thereby increase the load on the set of combustion cylinders associated with the regenerating particulate trap 48 or 50.

Having described the preferred embodiment, it will become apparent that various modifications can be made without departing from the scope of the invention as defined in the accompanying claims.

The invention claimed is:

1. A method of operating an internal combustion diesel engine including a plurality of combustion cylinders, comprising the steps of:
    filtering particulates from a first set of combustion cylinders using a first particulate trap in communication between the first set of combustion cylinders and a turbocharger;
    filtering particulates from a second set of combustion cylinders using a second particulate trap in communication between the second set of combustion cylinders and said turbocharger, and
    independently and selectively controlling the fluid flow through said first and second set of combustion cylinders by increasing a fuel rate to one set of combustion cylinders by an amount sufficient to regenerate the particulate trap associated with the set of combustion cylinders receiving the increased fuel rate and decreasing a fuel rate to the other set of combustion cylinders.

2. The method of operating an internal combustion engine of claim 1, wherein independently and selectively controlling the fluid flow through said first and second set of combustion cylinders includes the step of regenerating said first particulate trap and said second particulate trap independently from each other.

3. The method of operating an internal combustion engine of claim 1, wherein independently and selectively controlling the fluid flow through said first and second set of combustion cylinders includes the step of applying an exhaust brake to said second set of combustion cylinders.

4. The method of operating an internal combustion engine of claim 1, wherein independently and selectively controlling the fluid flow through said first and second set of combustion cylinders includes the step of applying an intake throttle to said second set of combustion cylinders.

5. The method of operating an internal combustion engine of claim 1, wherein independently and selectively controlling the fluid flow through said first and second set of combustion cylinders includes the step of increasing a fuel rate to said second set of combustion cylinders and decreasing a fuel rate to said first set of combustion cylinders, thereby regenerating said second particulate trap.

6. The method of operating an internal combustion engine of claim 5, wherein independently and selectively controlling the fluid flow through said first and second set of combustion cylinders includes the step of applying an exhaust brake to said first set of combustion cylinders.

7. The method of operating an internal combustion engine of claim 5, wherein independently and selectively controlling the fluid flow through said first and second set of combustion cylinders includes the step of applying an intake throttle to said first set of combustion cylinders.

8. The method of operating an internal combustion engine of claim 1, wherein variable geometry turbochargers independently and selectively control the fluid flow through the set of combustion cylinders with which they are associated.

* * * * *